US009637950B2

(12) United States Patent
Covington

(10) Patent No.: US 9,637,950 B2
(45) Date of Patent: May 2, 2017

(54) DUAL-LATCH LOCK AND RODENT BAIT STATION WITH DUAL-LATCH LOCK

(75) Inventor: Larry Covington, Weatherford, TX (US)

(73) Assignee: VM PRODUCTS, INC., Bedford, TX (US)

( * ) Notice: Subject to any disclaimer, the term of this patent is extended or adjusted under 35 U.S.C. 154(b) by 605 days.

(21) Appl. No.: 13/697,316

(22) PCT Filed: May 10, 2010

(86) PCT No.: PCT/US2010/034240
§ 371 (c)(1),
(2), (4) Date: Feb. 25, 2013

(87) PCT Pub. No.: WO2011/142739
PCT Pub. Date: Nov. 17, 2011

(65) Prior Publication Data
US 2013/0145801 A1 Jun. 13, 2013

(51) Int. Cl.
E05B 63/12 (2006.01)
E05B 65/52 (2006.01)
E05B 19/00 (2006.01)
E05B 63/22 (2006.01)
E05B 63/24 (2006.01)
(Continued)

(52) U.S. Cl.
CPC ........... E05B 65/52 (2013.01); A01M 25/004 (2013.01); E05B 19/00 (2013.01); E05B 19/0041 (2013.01); E05B 19/0047 (2013.01); E05B 35/008 (2013.01); E05B 63/12 (2013.01); E05B 63/22 (2013.01); E05B 63/24 (2013.01); E05B 65/006 (2013.01); E05C 19/06 (2013.01); Y10T 70/554 (2015.04); Y10T 70/7486 (2015.04)

(58) Field of Classification Search
CPC .. E05B 19/0047; E05B 57/00; E05B 63/0013; E05B 63/12; E05B 63/122; E05B 63/22; E05B 63/24; E05B 63/248; E05B 65/006; E05B 65/52; E05B 65/5246; E05B 65/5253; E05B 65/5261; E05B 65/5269; E05B 65/5276; E05B 11/00; E05B 11/005; E05B 19/00; E05B 19/0017; E05B 19/0041
USPC .......... 70/158, 159, 160, 344, 345, 346, 387
See application file for complete search history.

(56) References Cited

U.S. PATENT DOCUMENTS 117,064 A * 7/1871 Gaylord .................. E05B 19/00
70/404
305,451 A * 9/1884 Hillebrand .............. E05B 19/00
70/404
(Continued)

FOREIGN PATENT DOCUMENTS

WO WO 98/10645 3/1998
WO WO 2005/006857 1/2005

OTHER PUBLICATIONS

International Preliminary Report on Patentability issued in PCT/US2010/034240, mailed Nov. 22, 2012.
(Continued)

Primary Examiner — Christopher Boswell
(74) Attorney, Agent, or Firm — Norton Rose Fulbright US LLP

(57) ABSTRACT

Locks for use with pest-control devices such as bait stations or other loadable devices, kits that include a lock and key, and pest control devices that include a lock.

15 Claims, 10 Drawing Sheets

(51) Int. Cl.
*E05B 65/00* (2006.01)
*A01M 25/00* (2006.01)
*E05B 35/00* (2006.01)
*E05C 19/06* (2006.01)

(56) References Cited

U.S. PATENT DOCUMENTS

| | | | | |
|---|---|---|---|---|
| 2,133,187 | A | * | 10/1938 | Cheney .................. E05B 19/00 70/404 |
| 3,112,637 | A | | 12/1963 | Thomas .......................... 70/258 |
| 3,464,294 | A | * | 9/1969 | Kerr ........................ E05B 19/00 76/110 |
| 4,876,863 | A | * | 10/1989 | Mannato ........................... 70/64 |
| 4,991,413 | A | * | 2/1991 | Arnaldo ............................. 70/19 |
| 5,040,327 | A | | 8/1991 | Stack et al. ..................... 43/131 |
| 5,379,912 | A | | 1/1995 | Wolf ............................. 220/481 |
| 5,411,163 | A | | 5/1995 | Gueret .......................... 220/326 |
| 5,669,108 | A | * | 9/1997 | Ferrari et al. ................... 16/383 |
| 5,806,237 | A | | 9/1998 | Nelson et al. ................. 43/131 |
| 5,857,286 | A | | 1/1999 | Doucette ....................... 43/131 |
| 6,006,941 | A | | 12/1999 | Hitchings ..................... 220/284 |
| 6,082,042 | A | | 7/2000 | Issitt ................................ 43/131 |
| 6,182,482 | B1 | | 2/2001 | Issitt ............................... 70/160 |
| 6,199,414 | B1 | * | 3/2001 | Chang ............................ 70/168 |
| 6,237,970 | B1 | * | 5/2001 | Joannou ........................ 292/241 |
| 6,357,804 | B1 | * | 3/2002 | Bernier et al. ................. 292/114 |
| 6,397,517 | B1 | | 6/2002 | Leyerle et al. ................. 43/131 |
| 6,598,742 | B1 | | 7/2003 | Belden et al. ............. 206/308.2 |
| 6,874,274 | B2 | | 4/2005 | Townsend ...................... 43/131 |
| 7,165,427 | B1 | * | 1/2007 | Lai ................................. 70/159 |
| 7,377,141 | B2 | | 5/2008 | Javaux et al. ................. 70/168 |
| 8,561,847 | B2 | * | 10/2013 | Rosenkranz et al. ........... 70/162 |
| 8,720,107 | B1 | * | 5/2014 | Vickery ......................... 43/131 |
| 8,763,435 | B2 | * | 7/2014 | McCaffrey .......... E05B 19/0017 70/392 |
| 2004/0244274 | A1 | | 12/2004 | Dellevigne et al. ............ 43/131 |
| 2005/0262892 | A1 | | 12/2005 | Parsons et al. ................... 70/16 |
| 2006/0117644 | A1 | | 6/2006 | Hoyes et al. ................... 43/131 |
| 2008/0072475 | A1 | | 3/2008 | Nelson et al. .................. 43/131 |
| 2008/0110894 | A1 | | 5/2008 | Tissington et al. ........... 220/326 |
| 2009/0139133 | A1 | | 6/2009 | Harper ............................ 43/131 |
| 2010/0031557 | A1 | | 2/2010 | Vickery et al. ................. 43/131 |
| 2013/0118056 | A1 | * | 5/2013 | Covington ...................... 70/160 |

OTHER PUBLICATIONS

International Search Report and Written Opinion issued in PCT/US2010/03420, mailed Jan. 18, 2011.

* cited by examiner

US 9,637,950 B2

DUAL-LATCH LOCK AND RODENT BAIT STATION WITH DUAL-LATCH LOCK

CROSS REFERENCE TO RELATED APPLICATIONS

This application is a national phase application under 35 U.S.C. §371 of International Application No. PCT/US2010/034240 filed May 10, 2010, which is incorporated herein by reference in its entirety.

BACKGROUND

1. Field of the Invention

The present invention relates generally to loadable pest-control devices and, more particularly, but not by way of limitation, to locks suitable for use with loadable (e.g., reloadable) devices (e.g., rodent bait stations).

2. Description of Related Art

Loadable pest control devices (e.g., rodent bait stations) are known in the art, some of which have locks. U.S. Pat. Nos. 6,082,042 and 6,182,482 involve examples of rodent bait stations with locks, and are hereby incorporated by reference in their entireties.

SUMMARY

Some embodiments of the present locks comprise: a first lock portion having laterally opposed ledge portions each with a downward-facing latch surface, a post extending away from the ledge portions, and a longitudinal axis extending through substantially the center of the post, the post having a greatest width of at least 0.125 inches oriented perpendicular to the longitudinal axis; and a second lock portion defining an opening and having a pair of latch members on laterally opposed sides of the opening, the latch members each having a ledge extending toward the other latch member with an upward-facing latch surface, the opening having a middle portion and two outer end portions; where the second lock portion is configured to engage the first lock portion such that: the longitudinal axis of the first lock portion extends through the opening, and the upward-facing latch surfaces of the second lock portion contact the downward-facing latch surfaces of the first lock portion to resist separation of the first and second lock portions.

Some embodiments of the present locks comprise: a first lock portion having laterally opposed ledge portions each with a downward-facing latch surface, a post having a cross-sectional shape that tapers from a base cross-sectional area adjacent the ledge portions to a top cross-sectional area that is smaller than the base cross-sectional area, and a longitudinal axis extending through substantially the center of the post; and a second lock portion defining an opening and having a pair of latch members on laterally opposed sides of the opening, the latch members each having a ledge extending toward the other latch member with an upward-facing latch surface; where the second lock portion is configured to engage the first lock portion such that: the longitudinal axis of the first lock portion extends through the opening, and the upward-facing latch surfaces of the second lock portion contact the downward-facing latch surfaces of the first lock portion to resist separation of the first and second lock portions.

Some embodiments of the present locks comprise: a first lock portion having laterally opposed ledge portions each with a downward-facing latch surface, a post extending away from the ledge portions, and a longitudinal axis extending through substantially the center of the post, the post having a top; and a second lock portion defining an opening and having a pair of latch members on laterally opposed sides of the opening, the latch members each having a ledge extending toward the other latch member with an upward-facing latch surface, the opening having a middle portion and two outer end portions; where the second lock portion is configured to engage the first lock portion such that: the longitudinal axis of the first lock portion extends through the opening, the upward-facing latch surfaces of the second lock portion contact the downward-facing latch surfaces of the first lock portion to resist separation of the first and second lock portions, and the longitudinal distance between the top of the post and the opening is 0.25 inches or less. In some embodiments, a protrusion extends into at least one of the two outer end portions toward the middle portion of the opening. In some embodiments, a first protrusion extends into one of the two outer end portions toward the middle portion of the opening, and a second protrusion extends into the other of the two outer end portions toward the middle portion of the opening.

Some embodiments of the present locks comprise: a first lock portion having a base with a ledge portion having a downward-facing latch surface extending around substantially the entire perimeter of the base, a post extending away from the ledge portion, and a longitudinal axis extending through the base and substantially the center of the post; and a second lock portion defining an opening and having a pair of latch members on laterally opposed sides of the opening, the latch members each having a ledge extending toward the other latch member with an upward-facing latch surface; where the second lock portion is configured to engage the first lock portion such that: the longitudinal axis of the first lock portion extends through the opening, and the upward-facing latch surfaces of the second lock portion contact the downward-facing latch surface of the first lock portion to resist separation of the first and second lock portions.

Some embodiments of the present locks comprise: a first lock portion having a bottom; a post that has a top and a longitudinal axis extending through substantially the center of the post; and a ledge portion positioned between the top and the bottom, the ledge portion having a downward-facing latch surface, where the ledge portion extends farther from the longitudinal axis than any other portion of the first lock portion; and a second lock portion defining an opening and having a latch member having a ledge extending inward with an upward-facing latch surface, the opening having a middle portion and two outer end portions; where the second lock portion is configured to engage the first lock portion such that: the longitudinal axis of the first lock portion extends through the opening, and the upward-facing latch surface of the second lock portion contacts the downward-facing latch surface of the first lock portion to resist separation of the first and second lock portions.

Some embodiments of the present locks comprise: a first lock portion having laterally opposed ledge portions each with a downward-facing latch surface, a post extending away from the ledge portions, and a longitudinal axis extending through substantially the center of the post, the post having a top; and a second lock portion defining an opening and having a pair of latch members on laterally opposed sides of the opening, the latch members each having a ledge extending toward the other latch member with an upward-facing latch surface, the opening having a middle portion and two outer end portions, the second lock portion including a protrusion extending laterally into the outer end of at least one of the two lateral portions of the opening toward the middle portion; where the second lock portion is configured to engage the first lock portion such that: the longitudinal axis of the first lock portion extends through the opening, and the upward-facing latch surfaces of the second lock portion contact the downward-facing latch surfaces of the first lock portion to resist separation of the first and second lock portions. In some embodiments, a first protrusion extends into one of the two outer end portions toward the middle portion of the opening, and a second protrusion extends into the other of the two outer end portions toward the middle portion of the opening.

In some embodiments, the lock is configured such that rotation of the key (e.g., where the second lock portion is not separated from the first lock portion along the axis of the first lock portion) in a first rotational direction by a first amount causes the lock to change from a locked configuration to an unlocked configuration and rotation in a second rotational direction by a second amount causes the lock to changed from the unlocked configuration to a locked configuration, where the second rotational direction is opposite the first rotational direction and the second amount is less than the first amount, and where the rotation in the second direction begins where the rotation in the first direction ended.

In some embodiments, the lock is configured such that rotation of the key (e.g., where the second lock portion is not separated from the first lock portion along the axis of the first lock portion) in a first rotational direction will sequentially lock and unlock the lock. In some embodiments, the lock is configured such that rotation of the key in substantially equal increments (e.g., 90 or 180 degrees) in a first rotational direction will sequentially unlock and lock the lock (e.g., a first 90 degrees rotation will unlock the lock, a second 90 degrees rotation in the same rotational direction will lock the lock, a third 90 degree rotation in the same rotation direction will lock the lock, and so on.

In some embodiments, the second lock portion is configured such that a key that is inserted into the lock and rotated from an insertion position to a position sufficient to change the lock from a locked to an unlocked configuration is retained by the second lock portion such that rotation sufficient to return the key to its insertion position (or substantially its insertion position) is required in order to remove the key from the lock.

In some embodiments, a plane that intersects the post and is oriented perpendicular to the longitudinal axis of the post does not intersect any other portion of the first lock portion.

In some embodiments, at least one of the pair of latch members has a substantially planar surface, the second lock portion further comprises a web member, and the web member is substantially perpendicular to the substantially planar surface of the latch member. In some embodiments, the web member is coupled to the latch member. In some embodiments, the web member is unitary with the latch member. In some embodiments, the web member is on an opposite side of the latch member than the upward-facing latch surface. In some embodiments, if the second lock portion engages the first lock portion such that the upward-facing latch surfaces of the second lock portion contact the downward-facing latch surfaces of the first lock portion, the web member is substantially parallel to the longitudinal axis of the post of the first lock portion.

In some embodiments, the pair of latch members of the second lock portion each has a substantially planar surface, the second lock portion further comprises a pair of web members, and each of the pair of web members is substantially perpendicular to the substantially planar surface of a different one of the latch members. In some embodiments, the pair of web members are each coupled to the respective latch member. In some embodiments, the pair of web members are each unitary with the respective latch member. In some embodiments, the pair of web members are each on an opposite side of the respective latch member than the respective upward-facing latch surface. In some embodiments, if the second lock portion engages the first lock portion such that the upward-facing latch surfaces of the second lock portion contact the downward-facing latch surfaces of the first lock portion, the web members are substantially parallel to the longitudinal axis of the post of the first lock portion.

In some embodiments, the first lock portion and second lock portion each comprises a plastic. In some embodiments, the first lock portion and second lock portion each comprises a plastic.

Some embodiments of the present kits comprise: any embodiment of the present locks: and a key comprising a shaft having an end and a longitudinal axis extending through the end, the key defining an opening extending into the shaft from the end; where the key is configured to be inserted into the opening of the second lock portion such that the post of the first lock portion extends into the opening in the shaft and the key can be rotated to spread the latch members to permit separation of the first and second lock portions. In some embodiments, at least a portion of the shaft of the key is substantially cylindrical. In some embodiments, the key comprises a pair of protrusions each extending outward from the shaft to an outer end. In some embodiments, at least one of the protrusions of the key has a width that is less than the maximum transverse dimension of the shaft. In some embodiments, at least one of the protrusions of the key has a width that is at least 70% of the maximum transverse dimension of the shaft. In some embodiments, the protrusions are substantially perpendicular to the longitudinal axis of the shaft. In some embodiments, the outer end of at least one of the protrusions of the key includes a notch extending into the protrusion toward the longitudinal axis of the shaft. In some embodiments, the outer end of at least one of the protrusions of the key is configured to contact a planar surface to resist rotation of the key around the longitudinal axis of the shaft. In some embodiments, the outer end of at least one of the protrusions of the key is configured to contact a planar surface such that at least two laterally-spaced apart points on the outer end can simultaneously contact the planar surface. In some embodiments, at least one of latch members of the second lock portion has a substantially planar inner surface, and where the key is configured to be inserted into the opening of the second lock portion such that the post of the first lock portion extends into the opening in the shaft, and if the key is rotated such that the protrusions of the key spread the latch members, the outer end of at least one of the protrusions of the key will contact a corresponding latch member to resist rotation of the key. In some embodiments of the present kits, the key comprises a plastic.

Some embodiments of the present pest-control devices comprise: any embodiment of the present locks; a receptacle; and a door coupled to the receptacle. In some embodiments, the door is unitary with the receptacle. In some embodiments, the first lock portion is coupled to the receptacle, and the second lock portion is coupled to the door. In some embodiments, the first lock portion is unitary with the receptacle, and the second lock portion is unitary with the door. In some embodiments, the reloadable pest-control product comprises a rodent bait station. In some embodiments, the pest-control device comprises an insect bait station. In some embodiments, at least one of the receptacle and lid comprises a plastic.

Some embodiments of the present keys comprise: a shaft having an end and a longitudinal axis extending through the end, the key defining an opening extending into the shaft from the end. In some embodiments, at least a portion of the shaft of the key is substantially cylindrical.

Some embodiments of the present keys further comprise a pair of protrusions each extending outward from the shaft to an outer end. In some embodiments, at least one of the protrusions has a width that is less than the maximum transverse dimension of the shaft. In some embodiments, at least one of the protrusions has a width that is at least 50% of the maximum transverse dimension of the shaft. In some embodiments, the protrusions are substantially perpendicular to the longitudinal axis of the shaft. In some embodiments, the outer end of at least one of the protrusions includes a notch extending into the protrusion toward the longitudinal axis of the shaft. In some embodiments, the outer end of at least one of the protrusions of the key is configured to contact a planar surface such that at least two laterally-spaced apart points on the outer end can simultaneously contact the planar surface. In some embodiments, the key comprises a plastic.

Some embodiments of the present kits and pest-control devices include bait, such as bait that is designed to kill or incapacitate a pest, such as a mouse or a rat or an insect.

In any embodiment of the present disclosure, the term "substantially" may be substituted with "within [a percentage] of" what is specified, where the percentage includes 5, 10, and/or 15 percent.

Any embodiment of any of the present devices and kits can consist of or consist essentially of—rather than comprise/include/contain/have—any of the described steps, elements, and/or features. Thus, in any of the claims, the term "consisting of" or "consisting essentially of" can be substituted for any of the open-ended linking verbs recited above, in order to change the scope of a given claim from what it would otherwise be using the open-ended linking verb.

Details associated with the embodiments described above and others are presented below.

BRIEF DESCRIPTION OF THE DRAWINGS

The following drawings illustrate by way of example and not limitation. For the sake of brevity and clarity, every feature of a given structure is not always labeled in every figure in which that structure appears. Identical reference numbers do not necessarily indicate an identical structure. Rather, the same reference number may be used to indicate a similar feature or a feature with similar functionality, as may non-identical reference numbers. The figures are drawn to scale (unless otherwise noted), meaning the sizes of the depicted elements are accurate relative to each other for at least the embodiment depicted in the figures.

DESCRIPTION OF ILLUSTRATIVE EMBODIMENTS

Figure 1:
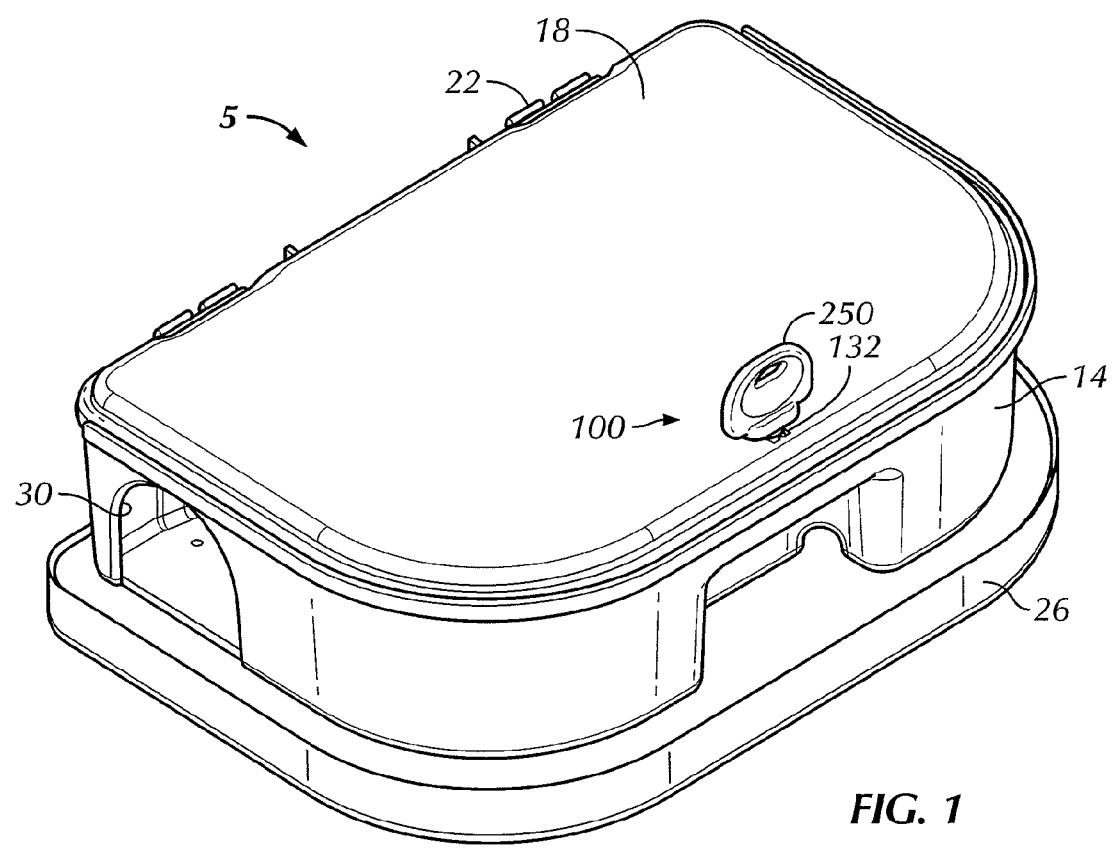
FIG. 1 depicts a perspective view of one of the present rodent bait stations with one of the present dual-latch locks.
Figure 2A:
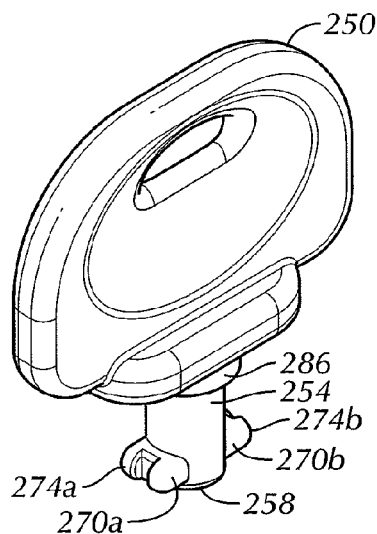
FIGS. 2A-2D depict various views of one of the present keys for use with some embodiments of the present dual-latch locks.
Figure 2B:
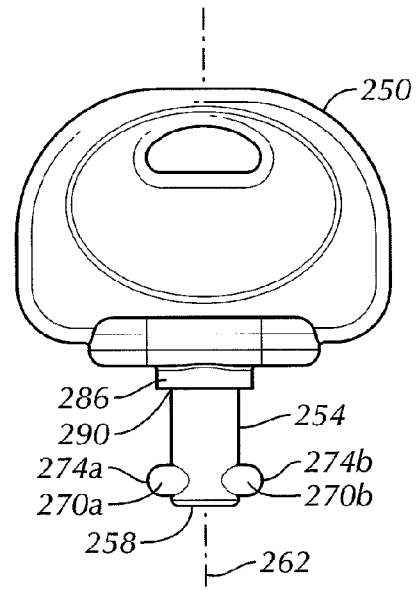
Figure 2C:
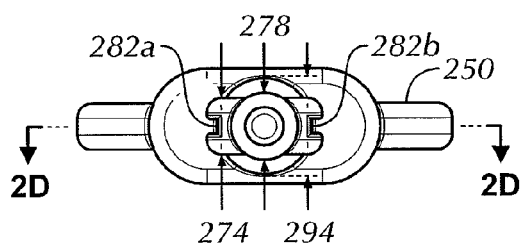
Figure 2D:
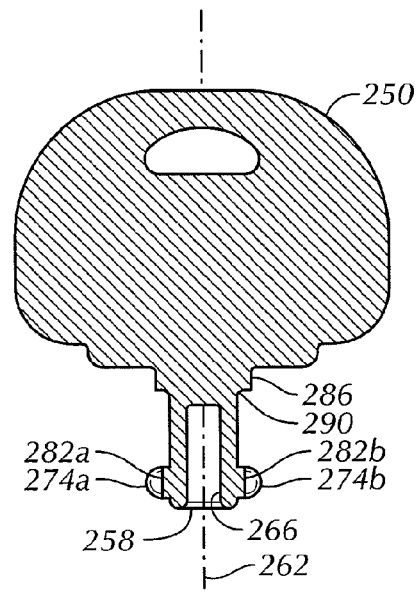

The term "coupled" is defined as connected, although not necessarily directly, and not necessarily mechanically; two items that are "coupled" may be unitary with each other. The terms "a" and "an" are defined as one or more unless this disclosure explicitly requires otherwise. The term "substantially" is defined as largely but not necessarily wholly what is specified (and includes what is specified; e.g., substantially 90 degrees includes 90 degrees and substantially parallel includes parallel), as understood by a person of ordinary skill in the art.

The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a device or kit that "comprises," "has," "includes" or "contains" one or more elements possesses those one or more elements, but is not limited to possessing only those elements. Likewise, a method that "comprises," "has," "includes" or "contains" one or more steps possesses those one or more steps, but is not limited to possessing only those one or more steps.

Further, a device or structure that is configured in a certain way is configured in at least that way, but it can also be configured in other ways than those specifically described. As used in this disclosure, a part or component that is unitary with another part or component means that the parts are of a physically continuous piece of material (e.g., are not physically separate from one another). For example, a receptacle with a unitary first lock portion can be molded as a single piece of material that includes the receptacle and the first lock portion. Similarly, a receptacle with a unitary first lock portion can be formed of a single piece of material that is machined to include the receptacle and first lock portion.

Referring now to the drawings, and more particularly to FIGS. 1-7, shown therein and designated by the reference numeral 10 is an embodiment of a loadable (and, in this case, reloadable) pest-control device 10. In the embodiment shown, reloadable pest-control device 10 comprises a rodent bait station and may be interchangeably referred to as bait station 10 or station 10. In some embodiments, bait station 10 comprises bait (e.g., poisoned bait) 12 (e.g., in any suitable form, such as, for example, solid, granular, liquid, etc.). The bait may be characterized as bait designed to kill pests (e.g., rodents such as mice or rats). However, it should be understood that in other embodiments, loadable pest-control device 10 can comprise any suitable loadable and/or reloadable pest-control device 10 (e.g., a reloadable pest-control device comprising a receptacle and a door), such as, for example, an insect bait station. In some embodiments, station 10 comprises an aerosol container configured to dispense pest attractant and/or poison. Furthermore, the present locks may be used with (either coupled to or unitary with) any device that is configured to be closed and opened, such as, for example: air fresheners, bird feeders and/or dispensers (e.g., dispensers for liquids, powders, food products, or paper goods, CDs, DVDs, video and/or audio cassette tapes, game pieces, office supplies, hardware, ammunition, fishing bait, and/or fish supplies). In some embodiments, the container and/or dispenser comprising the lock comprises one or more contents (e.g., one or more CDs and/or DVDs, rounds of ammunition, fishing bait, and/or the like).

In the embodiment shown, station 10 comprises a receptacle 14 (which may also be characterized as a base); and a door 18 coupled to receptacle 14. In the embodiment shown, door 18 is coupled to receptacle 14 by hinges 22. In other embodiments, door 18 can be coupled to receptacle 14 by any suitable structure and/or can be unitary with receptacle 14 (such that door 18 and receptacle 14 are comprised of the same piece of material and connected through a so-called living hinge). In the embodiment shown, station 10 is coupled to a weighted tray 26 (e.g., to provide stability to station 10 and/or to inhibit or reduce the likelihood of station 10 moving if a rodent enters station 10 (e.g., through opening 30)). In other embodiments, the weighted material is not positioned in a tray, such as, for example, in U.S. application Ser. No. 12/186,436, filed Aug. 5, 2008 and published as U.S. 2010/0031557, which is incorporated by reference. Station 10 can be coupled to tray 26 by any suitable fastener or structure. For example, in the embodiment shown, receptacle 14 is coupled to tray 26 by bolts or screws 34 and frusto-conical nuts 38. Nuts 38 can be, for example, unitary with tray 26. In other embodiments, any suitable fasteners can be used in addition to or in place of bolts or screws 34 and/or frusto-conical nuts 38 (e.g., hexagonal nuts, interlocking tabs, adhesive, or the like). Moreover, in other embodiments, any bait station—whether designed for rodents (e.g., rats and/or mice) or other pests—can be used in place of the depicted embodiment of station 10.

In the embodiment shown, station 10 (e.g., at least one of and/or both of receptacle 14 and lid 18) comprises plastic. For example, in some embodiments, receptacle 14 and/or door 18 comprises a plastic selected from the group consisting of: polypropylene (PP), polystyrene (PS), high impact polystyrene (HIPS), acrylonitrile butadiene styrene (ABS), polyethylene terephthalate (PET), polyvinyl chloride (PVC), polycarbonate (PC), polyethylene (PE), and polycarbonate/acrylonitrile butadiene styrene (PC/ABS), polycarbonate polybutylene terephthalate (PBT), acrylonitrile styrene acrylate (ASA), polyurethanes, nylon (often referred to as polyamide (PA)), combinations thereof, and/or other plastics or polymers. In other embodiments, station 10 (e.g., at least one of and/or both of receptacle 14 and lid 18) comprises a non-plastic material, such as, for example, a metal (e.g., steel, iron, aluminum, copper, brass, or the like), fiberglass, carbon fiber, synthetic materials, and/or other suitably durable and/or rigid materials.

In the embodiment shown, station 10 comprises a lock 100 that is configured to be operated (e.g., unlocked once locked and/or otherwise actuated) with a key 250 that can be inserted into lock 100 (e.g., to unlock lock 100 when locked and/or otherwise actuate lock 100). In the embodiment shown, lock 100 comprises a first lock portion 104 and a second lock portion 108. In the embodiment shown, first lock portion 104 has laterally opposed ledge portions 112a, 112b each with a downward-facing latch surface 116a, 116b. In the embodiment shown, first lock portion 104 also comprises a post 120 extending away from (e.g., upward from) ledge portions 112a, 112b, and a longitudinal axis 124 extending through substantially the center of post 120. In the embodiment shown, post 120 has a top 128. In the embodiment shown, first lock portion 104 also has a base portion 188. In the embodiment shown, base portion 188 is unitary with and extends (up) from receptacle 14. In the embodiment shown, post 120, ledge portions 112a, 112b and base 188 are unitary with each other. In the embodiment shown, ledge portions 112a, 112b are positioned between top 128 and the bottom of base 188 (where the base meets receptacle 14). Lock 100 may be characterized as one that has a first lock portion 104 having a ledge portion that extends farther from longitudinal axis 124 than any other portion of the first lock portion; more specifically, ledge portions 112a, 112b each extends farther from longitudinal axis 124 (in a direction perpendicular to longitudinal axis 124) than any other portion of first lock portion 104. In the depicted embodiment, lock portion 104 is configured such that a plane (not shown) that intersects post 120 and is oriented perpendicular to longitudinal axis 124 does not intersect any other portion of first lock portion 104.

In the embodiment shown, second lock portion 108 defines an opening 132 and has a pair of latch members 136a, 136b on laterally opposed sides of opening 132, as shown. Latch members 136a, 136b each have a ledge 140a, 140b, respectively. As shown, ledges 140a, 140b each extends toward the other latch member 140b, 140a (e.g., ledge 140a extends toward ledge 140b) with an upward-facing latch surface 144a, 144b, respectively. As shown, opening 132 has a middle portion 148 and two outer end portions 152a, 152b. In the embodiment shown, second lock portion 108 includes two recessed portions 156a, 156b, that are relatively shallow (e.g., extend a distance into the second portion of the lock that is less than the depth of latch members 136a, 136b,). More specifically, in the embodiment shown, recessed portions 156a, 156b, terminate in bottom surfaces 160a, 160b.

As used in this disclosure, the terms "upward," "downward," "top," and "bottom" are not absolute terms, and instead refer generally and relatively to elements and/or features such as in the orientation of station 10 shown in FIG. 1. For example, door 18 of station 10 is generally on or at the top, and receptacle 14 is generally one or at the bottom, of station 10, in the orientation shown in FIG. 1. As will be understood to those of ordinary skill in the art, "bottom" is generally opposite to "top," and "downward" is generally opposite of "upward." Likewise, as used in this disclosure, "downward-facing" need not be perpendicular to a vertical axis, and "upward-facing" need not be perpendicular to a vertical axis. Rather, as used in this disclosure, "downward facing" and "upward facing" mean not parallel to a vertical axis (e.g., angled at least, greater than, or between any of 0, 5, 10, 15, 20, 25, 30, 35, 40, 45, 50, 55, 60, 65, 70, 75, 80, 85, and/or 90 degrees relative to a vertical axis) in a generally upward direction (relative to a bottom, lower, or downward reference) or generally downward direction (relative to an top, lower, or upward reference), respectively.

Figure 3A:
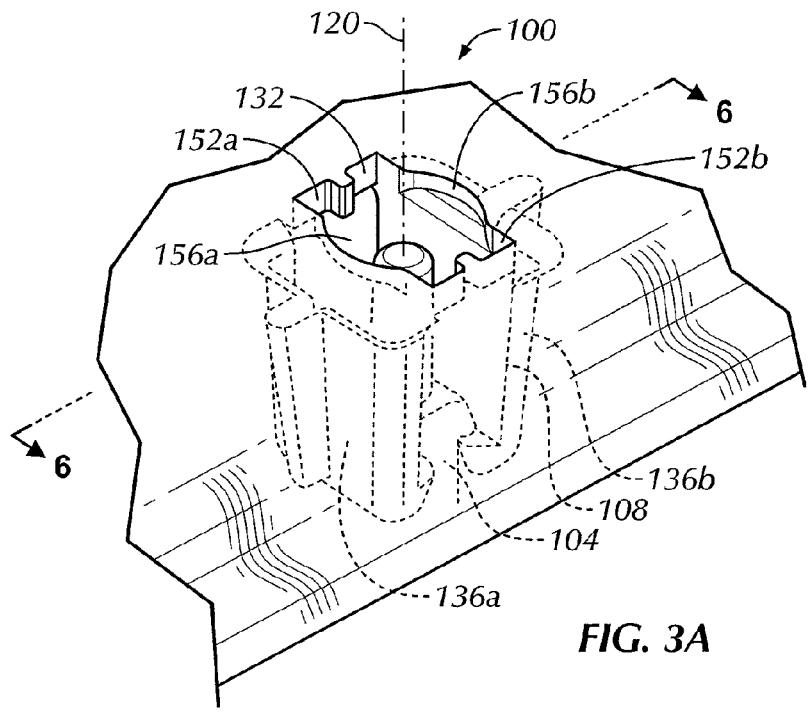
FIG. 3A depicts an enlarged perspective view of one of the present dual-latch locks having a first lock portion and a second lock portion.
Figure 3B:
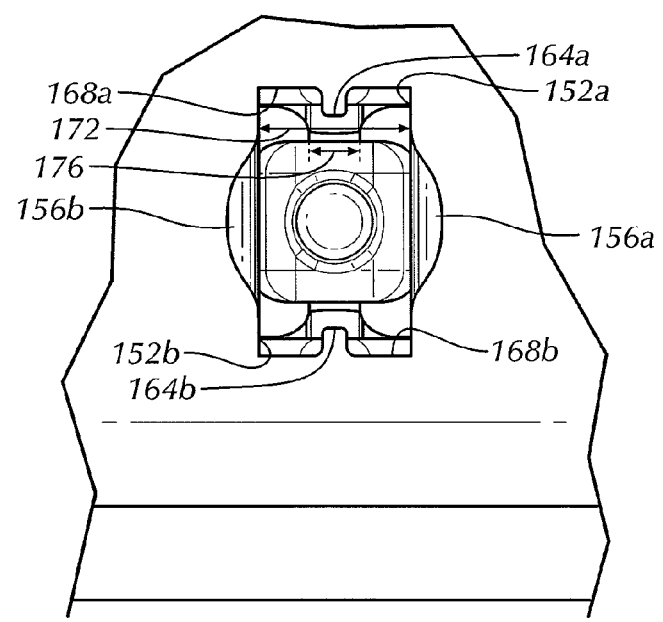
FIG. 3B depicts an enlarged top view of the dual latch lock of FIG. 3A.
Figure 4A:
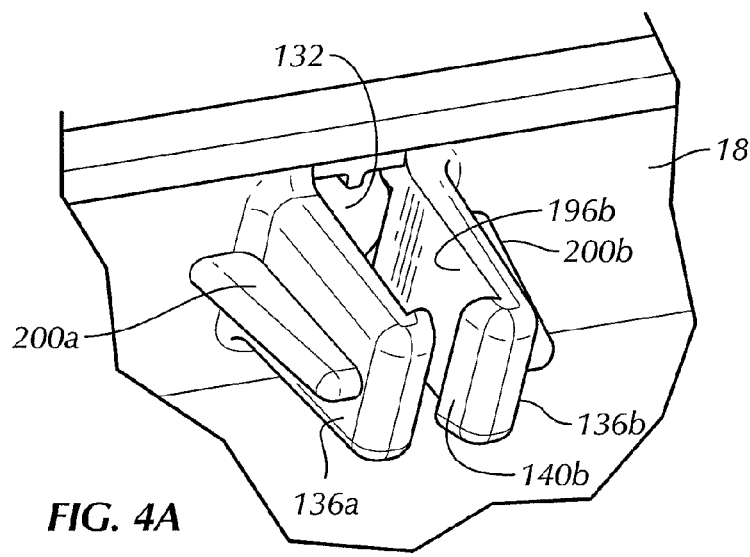
FIGS. 4A-4D depict various views of the second lock portion of the dual-latch lock of FIGS. 3A-3B.
Figure 4B:
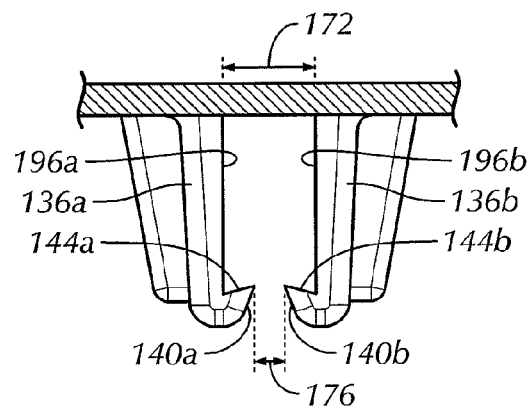
Figure 4C:
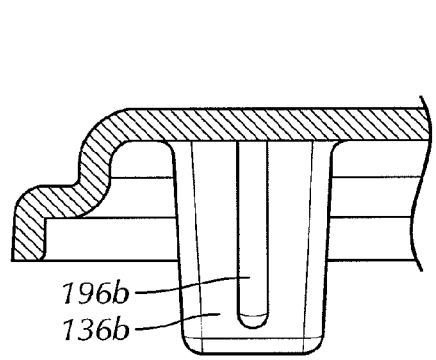
Figure 4D:
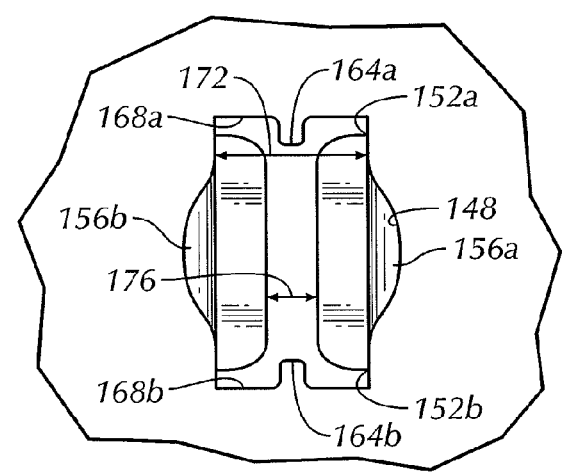
Figure 5A:
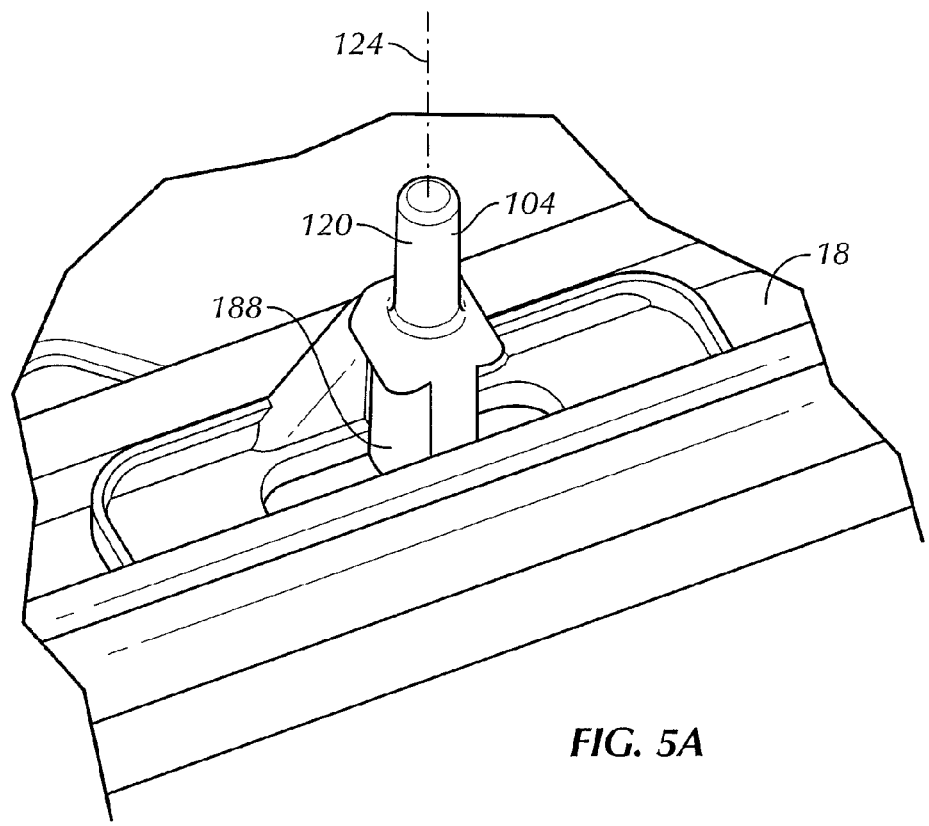
FIG. 5A-5C depict various views of the first lock portion of the dual-latch lock of FIGS. 3A-3B.
Figure 5B:
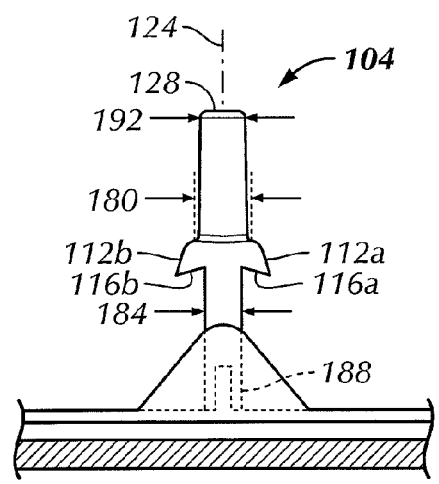
Figure 5C:
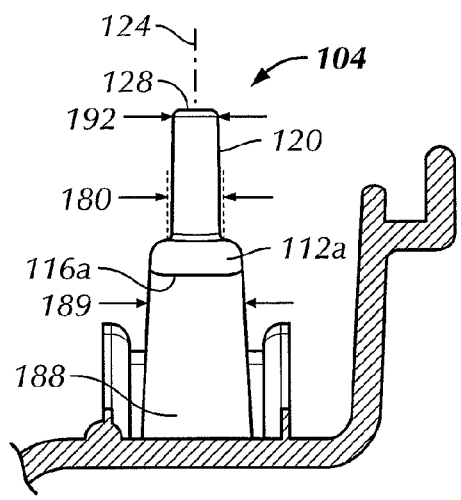
Figure 6A:
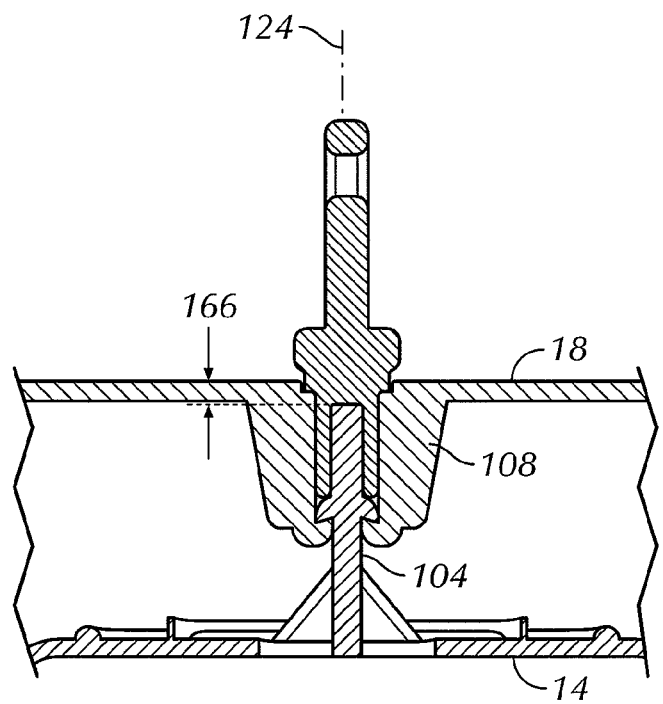
FIG. 6A depicts a cross-sectional view taken along the line 6-6 of FIG. 3A of the key of FIGS. 2A-2D in the lock of FIGS. 3A-3B with the lock in a locked position.

As illustrated, for example, in FIGS. 3A and 6A, second lock portion 108 is configured to engage first lock portion 104 such that longitudinal axis 124 of first lock portion 104 extends through opening 132 (e.g., substantially the center of opening 32), and upward-facing latch surfaces 144a, 144b of second lock portion 108 contact downward-facing latch surfaces 116a, 116b, of first lock portion 104 to resist separation of the first and second lock portions, and such that the longitudinal distance (label 166 in this embodiment) between top 128 of post 120 and opening 132 (specifically, the top of opening 132, as indicated) is 0.25 inches or less (e.g., less than, equal to, or between any of 0.1, 0.15, 0.2, and/or 0.25 inches). In other embodiments, top 128 of post 120 can be any suitable longitudinal distance from opening 132 when second lock portion 108 engages first lock portion 104.

In the embodiment shown, second lock portion 108 is configured such that a protrusion 164a or 164b extends into at least one of the two outer end portions 152a or 152b toward middle portion 148 of opening 132. More particularly, in the embodiment shown, a first protrusion 164a extends into one of the two outer end portions 152a toward middle portion 148 of opening 132, and a second protrusion 164b extends into the other of the two outer end portions 152b toward middle portion 148 of opening 132. Other embodiments may include only a single protrusion (e.g., 164a or 164b), or no protrusions into opening 132.

In the embodiment shown, opening 132 can be described as having a shallow portion (corresponding to recessed portions 156a, 156b,) and a deeper portion (having and corresponding to width 172). In the embodiment shown, the deeper portion of opening 132 has a substantially constant width 172 that extends through second lock portion 108 until it is interrupted by ledges 140a, 140b extending toward one another into width 172, such that width 176 extends between the innermost portions of ledges 140a and 140b. In various embodiments of the present lock 100, width 176 can be equal to, greater than, or between any of: 30, 40, 50, 60, 70, 80, and/or 90 percent of width 172. In the embodiment shown, at least a part of the deeper portion of opening 132 is configured to comprise a substantially rectangular shape (e.g., elongated substantially rectangular) extending between outer end portions 152a and 152b (e.g., outer end portions 152a and 152b each has an outer edge 168a or 168b, and outer edges 168a and 168b are substantially parallel to each other).

In the embodiment shown, post 120 has a maximum transverse dimension 180 (e.g., greatest width or greatest diameter) of at least 0.125 inches oriented (measured) perpendicular to longitudinal axis 124. In other embodiments, dimension 180 can be any suitable dimension, such as, for example, equal to, greater than, or between any of: 0.125, 0.15, 0.2, 0.25, 0.30, 0.35, 0.4, 0.45, and/or 0.5 inches. In the embodiment shown, post 120 has a maximum transverse dimension 180 that is greater than at least one transverse dimension 184 (e.g., width or diameter width as in the embodiment shown) of base 188. In other embodiments, dimension 184 can be greater than dimension 180. In the embodiment shown, base 188 has at least one transverse dimension 189 that is greater than both dimension 184 and dimension 180. In the embodiment shown, dimensions 180, 184 and 189 are oriented perpendicular to axis 124.

In the embodiment shown, post 120 has a shape (e.g., a cross-sectional shape) that tapers from a base area (e.g., at transverse dimension 180; and, more specifically, a base cross-sectional area (e.g., at transverse dimension 180)) adjacent (e.g., just above) ledge portions 112a, 112b to a top area (e.g., at transverse dimension 192; and, more specifically, a top cross-sectional area (e.g., at transverse dimension 192)) that is smaller than the base area. For example, in the embodiment shown, the longitudinal portion of post 120 between ledge portions 112a, 112b and top 128 has a substantially circular shape (e.g., in a plane transverse to axis 124), and diameter 180 is larger than diameter 192, such that the perimeter at diameter 192 (and, in this embodiment, the cross-sectional area at diameter 192) is smaller than the perimeter of the post at diameter 180 (and, in this embodiment, the cross-sectional area at diameter 180); and the perimeter (and, in this embodiment, the cross-sectional area) of post 120 decreases as the distance from top 128 decreases. While transverse dimensions 180 and 192 are described as diameters, in embodiments with non-circular cross-sectional shapes, transverse dimensions (e.g., maximum transverse dimensions) 180 and 192 may not be diameters. Transverse dimensions 180 and 192 can be any suitable size relative to one another. For example, in some embodiments, dimension 192 is less than, equal to, or between any of 10, 20, 30, 40, 50, 60, 70, 80, 90, 95, and/or 99 percent of dimension 180.

In the embodiment shown, ledge portions 112a, 112b extend along only two laterally opposed sides of first lock portion 104. However, in other embodiments, first lock portion 104 has a ledge portion (e.g., similar to 112a, 112b) having a downward-facing latch surface (e.g., similar to 116a, 116) extending around substantially its entire perimeter.

In the embodiment shown, second lock portion 108 is configured such that at least one of (e.g., each of both) latch members 136a, 136b has a substantially planar surface 196a, 196b, respectively. Additionally, in the embodiment shown, second lock portion 108 further comprises at least one web member 200a that is substantially perpendicular to substantially planar surface 196a of latch member 136a. In the embodiment shown, second lock portion 108 comprises two web members 200a, 200b, each substantially perpendicular to the substantially planar surface of the respective latch member 136a or 136b (i.e., web member 200a is substantially perpendicular to surface 196a, and web member 200b is substantially perpendicular to surface 196b).

Stated another way, in the embodiment shown, each of the pair of latch members 136a, 136b, has a substantially planar surface 196a, 196b, respectively, and each of the pair of web members 200a, 200b is substantially perpendicular to the substantially planar surface 196a or 196b of a different one of latch members 136a or 136b. In the embodiment shown, web members 196a, 196b, are coupled to (e.g., unitary with) their respective latch members 144a, 144b. In the embodiment shown, web members 200a, 200b are on the opposite sides of their respective latch members 136a, 136b, than upward-facing latch surfaces 144a, 144b, respectively. In other embodiments, web members 200a, 200b may be on the same side of their respective latch members 136a, 136b, as upward-facing latch surfaces 144a, 144b, respectively. In the embodiment shown, lock 100 is configured such that if second lock portion 108 engages first lock portion 104 (e.g., FIG. 3A) such that upward-facing latch surfaces 144a, 144b of second lock portion 108 contact downward-facing latch surfaces 116a, 116b, of first lock portion 104, and one or both of surfaces 196a, 196b, are parallel to axis 124. In other embodiments, surfaces 196a, 196b, can be disposed at any suitable angle relative to each other (e.g., equal to, less than, or between any of: 1, 5, 10, 15, 20, 25, and/or 30 degrees).

For example, in such embodiments, latch members 136a, 136b can be configured such that when second lock portion 108 is engages first lock portion 104 (e.g., lock 100 is in a locked configuration) axis 124 extends through opening 132 and surfaces 196a and 196b are disposed at angles of equal magnitude relative to axis 124 (e.g., equal to, less than, or between any of: 0, 2.5, 5, 7.5, 10, 12.5, and/or 15 degrees).

In some embodiments, first lock portion 104 and/or second lock portion 108 are modular and/or not unitary with station 10 (e.g., not unitary with receptacle 14 and/or lid 18). For example, in some embodiments, station 10 comprises a metal or other non-plastic material, and first lock portion 104 and/or second lock portion 108 comprise plastic and are configure to be coupled to receptacle 14 or lid 18, respectively. In some embodiments, one or each of first lock portion 104 and second lock portion 108 comprises a plastic, such as, for example, a plastic selected from the group consisting of: polypropylene (PP), polystyrene (PS), high impact polystyrene (HIPS), acrylonitrile butadiene styrene (ABS), polyethylene terephthalate (PET), polyvinyl chloride (PVC), polycarbonate (PC), polyethylene (PE), and polycarbonate/acrylonitrile butadiene styrene (PC/ABS), polycarbonate polybutylene terephthalate (PBT), acrylonitrile styrene acrylate (ASA), polyurethanes, nylon (often referred to as polyamide (PA)), combinations thereof, and/or other plastics or polymers. In other embodiments, first lock portion 104 comprises a non-plastic material, such as, for example, a metal (e.g., steel, iron, aluminum, copper, brass, or the like), fiberglass, carbon fiber, synthetic materials, and/or other suitably durable and/or rigid materials.

Some embodiments of the present kits comprise one or more (e.g., two) of the present locks 100. Some embodiments of the present kits comprise one or more of the present keys 250. In the embodiment shown, lock 100 is configured to be unlocked by key 250. In the embodiment shown, key 250 comprises a shaft 254 having an end 258 and a longitudinal axis 262 extending through end 258 (in particular, through substantially the center of shaft 254). In the embodiment shown, key 250 has or defines an opening 266 extending into shaft 254 from end 258. In the embodiment shown, key 250 is configured to be inserted into opening 132 of second lock portion 108 such that post 120 of first lock portion 104 extends into opening 266 in shaft 254 and key 250 can be rotated (e.g., by 90 degrees) to spread latch members 136a, 136b to permit separation of first and second lock portions 104 and 108 (e.g., FIG. 6B). In the embodiment shown, shaft 254 is substantially cylindrical and has a circular cross-sectional shape. In other embodiments, shaft 254 can have any suitable cross-sectional shape (e.g., square, triangular, hexagonal, octagonal, or the like) and/or can be non-cylindrical.

Figure 6B:
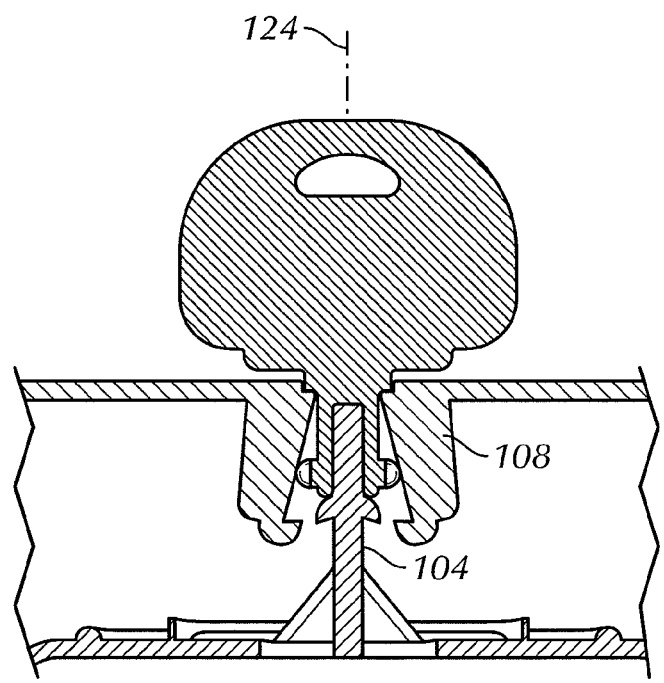
FIG. 6B depicts a cross-sectional view taken along the line 6-6 of FIG. 3A of the key of FIGS. 2A-2D in the lock of FIGS. 3A-3B with the lock in an un-locked position.

In the embodiment shown, latch members 136a, 136b, comprise a resilient material (e.g., a resilient plastic) such that latch members 136a, 136b are biased toward their resting (locked) position. For example, in the embodiment shown, latch members 136a, 136b comprise a resilient material such that if key 250 is inserted through opening 132 and rotated 90 degrees, latch members 136a and 136b are spread apart and lock 100 is unlocked as shown in FIG. 6B; but if key is rotated back from the insertion position, latch members 136a and 136b attempt to return to their resting state and thereby return lock 100 to a locked configuration. In this way, in the embodiment shown, second lock portion 108 is biased toward a locked position such that if second lock portion 108 engages or is in a position to engage first lock portion 104, second lock portion 108 will default to a locked configuration (e.g., if key 250 is not inserted and rotated sufficiently to disengage second lock portion 108 from first lock portion 104 (e.g., to unlock lock 100)). Furthermore, in the embodiment shown, the first and second lock portions are configured such that the degree of rotation that unlocks them from them each other is greater than the degree of rotation that will return them to a locked configuration (e.g., 90 degrees of rotation of the key in one direction will achieve an unlocked position, while less than 90 degrees of rotation in the opposite direction (starting from the unlocked position) will return the first and second lock portions to a locked configuration).

In the embodiment shown, key 250 comprises a pair of protrusions 270a, 270b each extending outward from shaft 254 to an outer end 274a, 274b, respectively. In the embodiment shown, at least one of (e.g., both of) protrusions 270a, 270b of key 254 has a width 274 that is less than (e.g., equal to, at least, or between any of: 70, 80, 90, and/or 95 percent of) the maximum transverse dimension (e.g., diameter) 278 of shaft 254. In the embodiment shown, protrusions 270a, 270b are (e.g., a longitudinal axis of each of the protrusions is) substantially perpendicular to longitudinal axis 262 of shaft 254. In the embodiment shown, the outer end (e.g., 274a, 274b) of at least one of (e.g., both of) protrusions 270a, 270b includes a notch 282a, 282b, respectively, extending into the protrusion toward longitudinal axis 262 of shaft 254. In the embodiment shown, notches 282a, 282b are configured to receive protrusion 164a and/or 164b of second lock portion 108. In some embodiments, notch 282a (and/or protrusion 164a) has a different size or shape than notch 282b (and/or protrusion 164b), such that, for example, key 250 can only be inserted into opening 132 in one orientation relative to opening 132 and/or second lock portion 108. Similarly, protrusions 270a, 270b are configured to fit through outer end portions 152a, 152b, respectively, of opening 132 (e.g., in the embodiment shown, protrusions have a width 274 that is less than width 172 of opening 132); and shaft 254 is configured to fit through middle portion 156 of opening 132 (e.g., in the embodiment shown, shaft 254 has a diameter 278 that is less than width 274 of middle portion 148 of opening 132).

In the embodiment shown, the outer end (e.g., 274a, 274b) of at least one of (e.g., both of) protrusions 270a, 270b is configured to contact a planar surface (e.g., one of substantially planar surfaces 196a, 196b,) to resist rotation of key 250 around longitudinal axis 262. For example, in the embodiment shown, the outer end (e.g., 274a, 274b) of at least one of (e.g., both of) protrusions 270a, 270b is configured to contact a planar surface such that at least two laterally-spaced apart points (e.g., a point on each side of notch 282a or 282b that together faun a line that is perpendicular to axis 262) on the outer end (274a or 274b, respectively) simultaneously contact the planar surface (e.g., one of substantially planar surfaces 196a, 196b,). In the embodiment shown, at least one of latch members 136a, 136b, has a substantially planar inner surface 196a, 196b, respectively; key 250 is configured to be inserted into opening 132 such that post 120 extends into opening 266 in shaft 254, and if key 250 is rotated such that protrusions 270a, 270b spread latch members 136a, 136b, respectively, the outer end (e.g., 274a, 274b) of at least one (e.g., both) of the protrusions will contact a corresponding latch member 136a, 136b, (e.g., will contact a substantially planar surface 196a or 196b,) to resist rotation of key 250 relative to second lock portion 108. In this way, as key 250 is rotated from the insertion orientation in which protrusions 164a and 164b are aligned with notches 282a and 282b (FIG. 6A), to the unlocked configuration (FIG. 6B), only one portion of protrusions 270a, 270b, respectively (e.g., a portion of protrusion 270a on one side of notch 282a and a portion of protrusion 270b on one side of notch 282b) touches a surface 196a or 196b, until the key 250 is rotated to the unlocked position (FIG. 6B), at which point at least two laterally-spaced apart points on an outer end 274a or 274b contact a surface 196a or 196b.

In the embodiment shown, key 250 can be inserted into opening 132 and rotated substantially 90 degrees to unlock lock 100 (e.g., to place lock 100 in an unlocked configuration in which second lock portion 108 can be separated from first lock portion 104), and the key 250 (e.g., outer ends 274a, 274b) will contact second lock portion 108 (e.g., surfaces 196a, 196b) to resist rotation of key 250 relative to second lock portion 108 such that key 250 is substantially retained in second lock portion 108 while second lock portion 108 is separated from first lock portion 104 (e.g., to resist the likelihood of key 250 being misplaced or lost while the lock is in the unlocked configuration). As a result, in like embodiments, the key may be retained in the lid of the device while the lid is in an open position, as shown in, for example, FIG. 7.

In the embodiment shown, key 250 comprises a base 286 at a proximate end 290 of shaft 254. In the embodiment shown, base 286 is substantially cylindrical and has a substantially circular cross-sectional shape. In other embodiments, base 286 can have any suitable configuration, including, for example, the configurations examples listed above for shaft 254. In the embodiment shown, base 286 is configured to fit into and/or be received by recessed portions 156a, 156b such that base 286 rotated within recessed portions when key 250 is inserted into opening 132 to operate, actuate, or unlock lock 100 (e.g., permit second lock portion 108 to disengage first lock portion 104). In the embodiment shown, base 286 has a transverse dimension (e.g., a maximum transverse dimension, such as, for example, a diameter) 294 that is greater than transverse dimension 278 of shaft 254 (dimension 278 is less than, e.g., equal to, at least, or between any of: 60, 70, 80, 90, and/or 95 percent of dimension 294). Further, the perimeter of base 286 (taken perpendicular to axis 262) is greater than the perimeter of shaft 254 at dimension 278, and in other embodiments this may be true for different configurations of base 286 and shaft 254.

In the embodiment shown, key 250 can be inserted into opening 132 and rotated either clockwise or counter-clockwise to unlock lock 100. In the embodiment shown, if key 250 is inserted into opening 132 and rotated substantially 90 degrees, key 250 will unlock lock 100 (separate latch members 136a and 136b to permit second lock portion 108 to disengage and be separated from first lock portion 104). In the embodiment shown, rotation of key 250 is not limited, such that key 250 can be rotated in either direction to successively unlock and lock the lock. For example, if key 250 is inserted into opening 132 and rotated clockwise substantially 90 degrees, lock 100 will unlock; if key 250 is rotated clockwise another substantially 90 degrees (substantially 180 degrees total) lock 100 will lock again; if key 250 is rotated clockwise another substantially 90 degrees (substantially 270 degrees total) lock 100 will unlock again; and so on, in either direction. In other embodiments, lock 100 (e.g., second lock portion 108) can be configured such that key 250 can be rotated only clockwise or counter-clockwise (e.g., without breaking lock 100), such as, for example, by way of tabs or the like. Furthermore, in other embodiments, lock 100 (e.g., second lock portion 108) can be configured such that key 250 can be rotated only clockwise or counter-clockwise by a certain amount less than or equal to 180 degrees (e.g., without breaking lock 100), such as, for example, by way of tabs or the like restricting key 250 from rotating more than 90 degrees, more than 135 degrees, or more than 180 degrees.

In some embodiments, key 250 comprises a plastic, such as, for example, a plastic selected from the group consisting of: polypropylene (PP), polystyrene (PS), high impact polystyrene (HIPS), acrylonitrile butadiene styrene (ABS), polyethylene terephthalate (PET), polyvinyl chloride (PVC), polycarbonate (PC), polyethylene (PE), and polycarbonate/acrylonitrile butadiene styrene (PC/ABS), polycarbonate polybutylene terephthalate (PBT), acrylonitrile styrene acrylate (ASA), polyurethanes, nylon (often referred to as polyamide (PA)), combinations thereof, and/or other plastics or polymers. In other embodiments, key 250 comprises a non-plastic material, such as, for example, a metal (e.g., steel, iron, aluminum, copper, brass, or the like), fiberglass, carbon fiber, synthetic materials, and/or other suitably durable and/or rigid materials.

Figure 7:
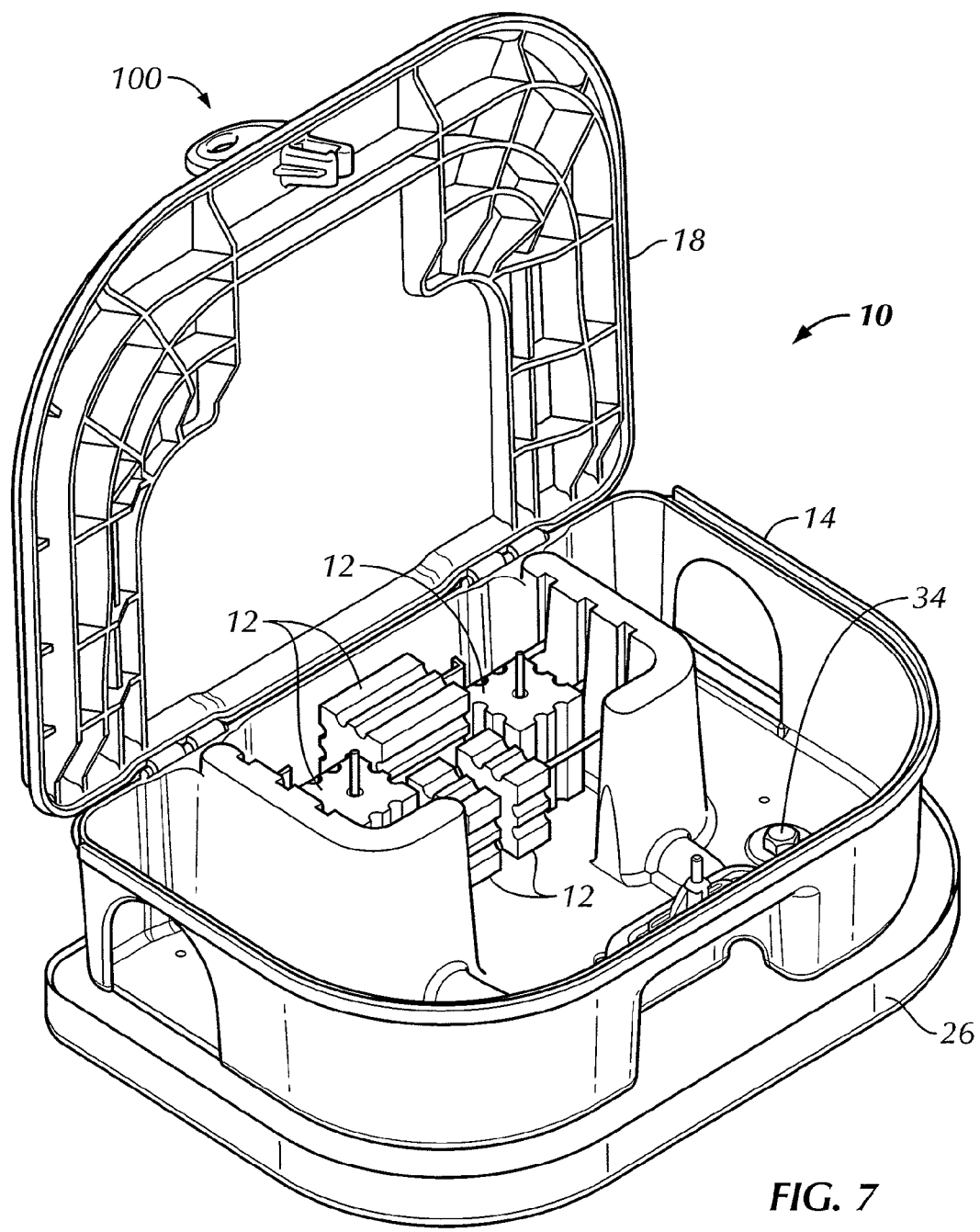
FIG. 7 depicts a perspective view of the rodent bait station of FIG. 1 with the lid of the bait station open.
Figure 8:
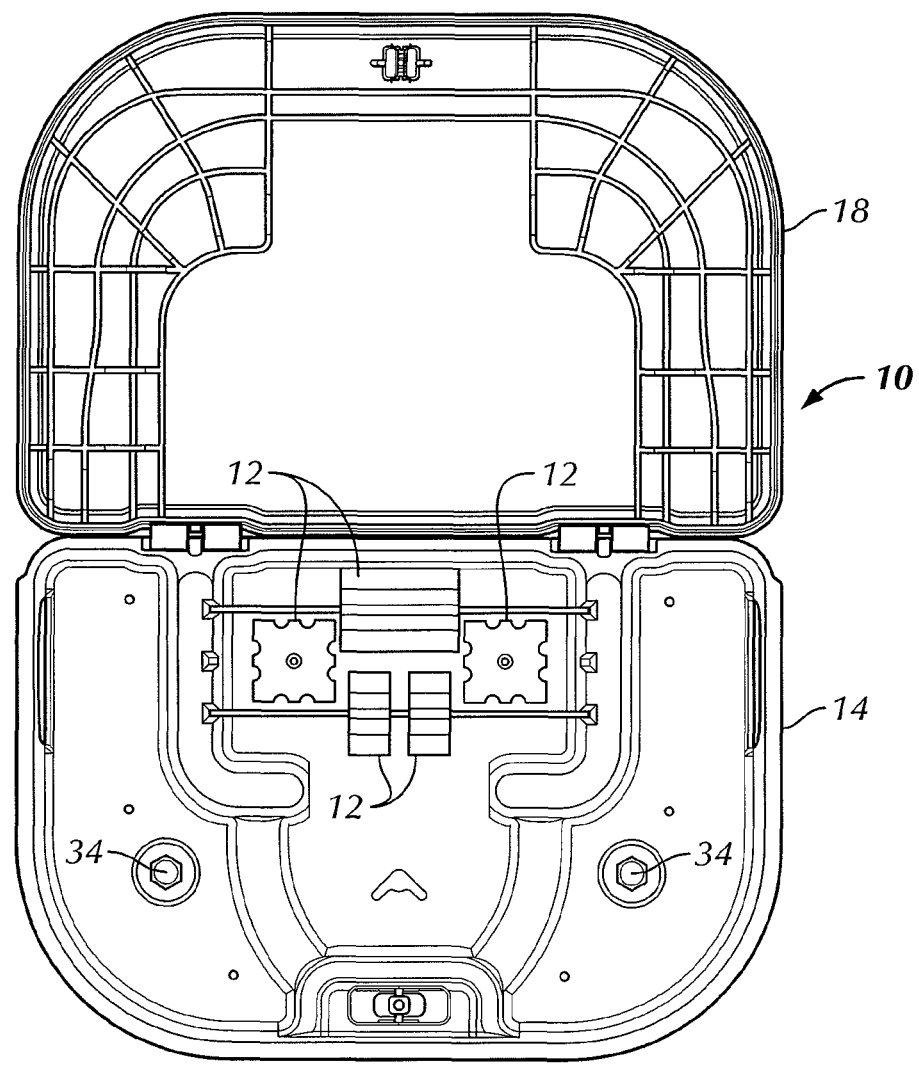
FIG. 8 depicts a top view of the bait station of FIG. 1 with the lid of the bait station open.
Figure 9:
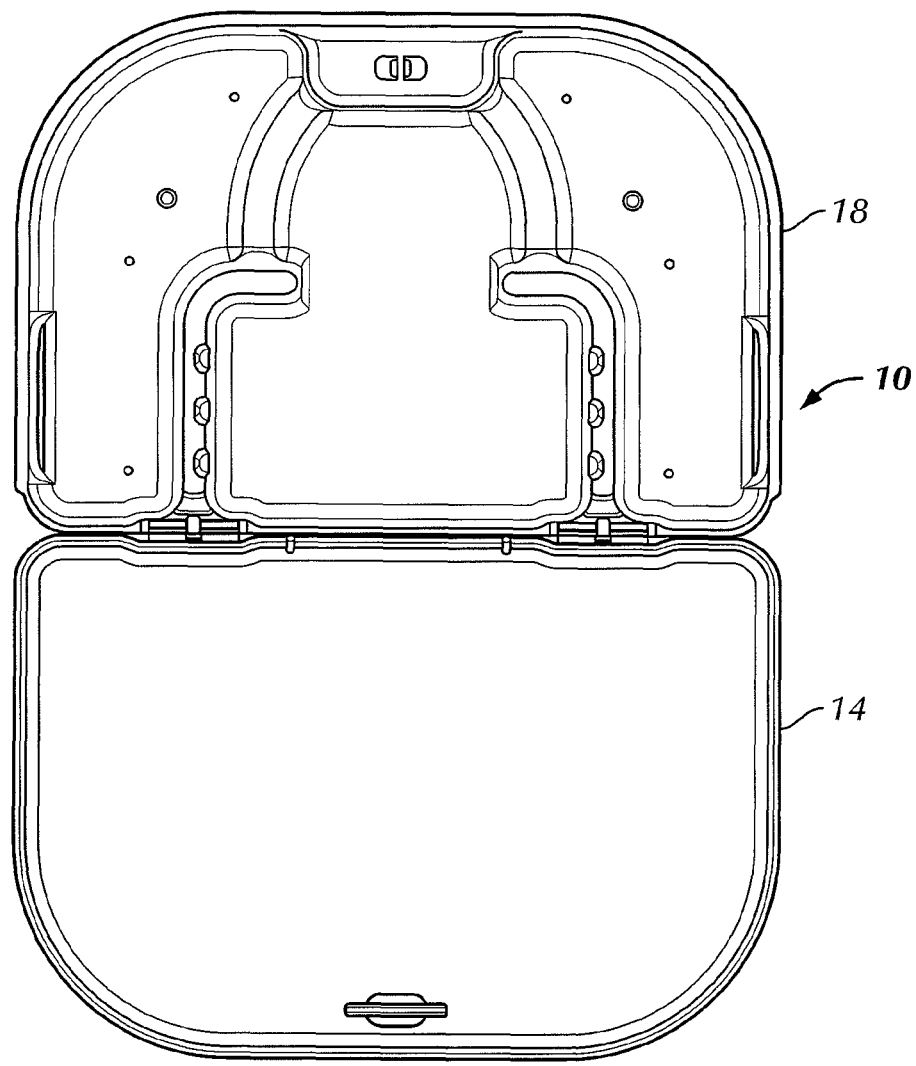
FIG. 9 depicts a bottom view of the bait station of FIG. 1 with the lid of the bait station open.
Figure 10:
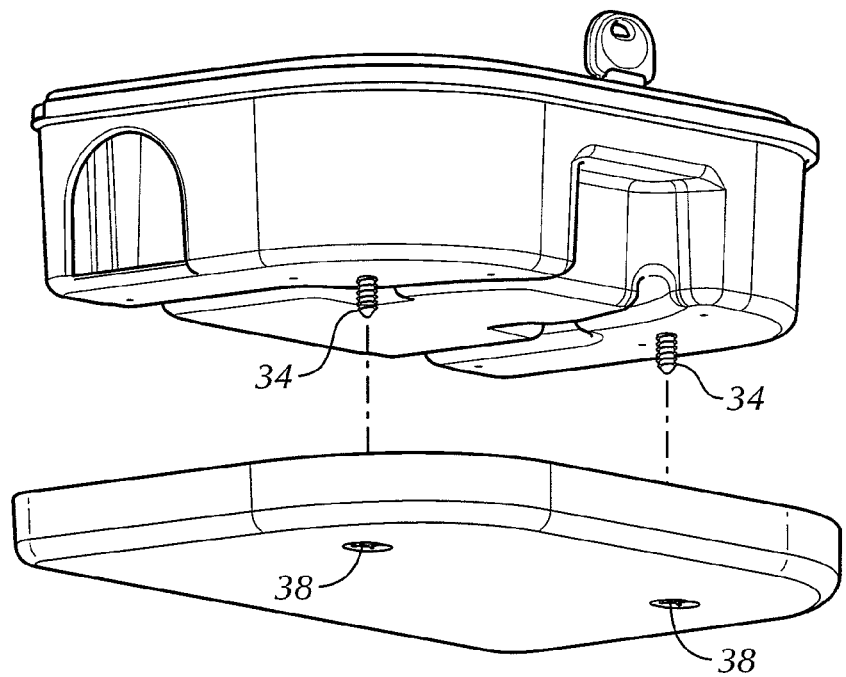
FIG. 10 depicts a partially exploded lower perspective view of the bait station of FIG. 1.
Figure 11:
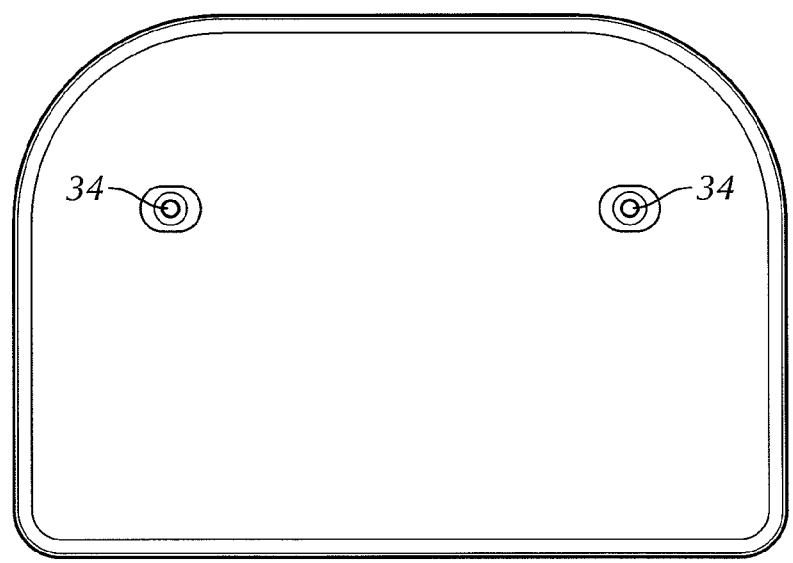
FIG. 11 depicts a bottom view of a weighted tray for use with embodiment of the present rodent bait stations.

The various illustrative embodiments of the present devices and kits are not intended to be limited to the particular forms disclosed. Rather, they include all modifications, equivalents, and alternatives falling within the scope of the claims. For example, embodiments other than the one shown may include some or all of the features of the depicted embodiment. As another example, a given kit may include bait, such as bait designed to kill a rodent (and as shown in FIG. 7). A given kit may also be enclosed in packaging, such as shrink wrap, a box (e.g., made from plastic, cardboard, a combination of the two, or any other suitable material). In some embodiments, the present devices include a single key, such as key 250, that is enclosed in packaging without any other devices, such as in the type of packaging described above.

The claims are not intended to include, and should not be interpreted to include, means-plus- or step-plus-function limitations, unless such a limitation is explicitly recited in a given claim using the phrase(s) "means for" or "step for," respectively.

The invention claimed is:
1. A pest-control device comprising:
a lock comprising:
a first lock portion having laterally opposed ledge portions each with a downward-facing latch surface, a post extending away from the ledge portions, and a longitudinal axis extending through substantially the center of the post, the post having a top; and
a second lock portion defining an opening and having a pair of latch members on laterally opposed sides of the opening, the latch members each having a ledge extending toward the other latch member with an upward-facing latch surface, the opening having a middle portion and two opposing outer end portions extending outwardly from the middle portion to respective distal ends that are separated by a distance measured in a first direction, the middle portion has a width measured in a second direction perpendicular to the first direction, and the width is smaller than the distance, the second lock portion including at least one protrusion extending from one of the distal ends laterally into the opening toward the middle portion;
where the second lock portion is configured to engage the first lock portion such that:
the longitudinal axis of the first lock portion extends through the opening, and the upward-facing latch surfaces of the second lock portion contact the downward-facing latch surfaces of the first lock portion to resist separation of the first and second lock portions;

a receptacle; and a door coupled to the receptacle;

where the first lock portion is coupled to one of the receptacle and the door, and the second lock portion is coupled to the other of the receptacle and the door.

2. The pest-control device of claim 1, where the door is unitary with the receptacle.

3. The pest-control device of claim 1, where the first lock portion is coupled to the receptacle, and the second lock portion is coupled to the door.

4. The pest-control device of claim 1, where the first lock portion is unitary with the receptacle, and the second lock portion is unitary with the door.

5. The pest-control device of claim 1, where the reloadable pest-control product comprises a rodent bait station.

6. The pest-control device of claim 1, where the pest-control device comprises an insect bait station.

7. The pest-control device of claim 1, where at least one of the receptacle and lid comprises a plastic.

8. The pest-control device of claim 1, where a first protrusion extends into one of the two outer end portions toward the middle portion of the opening, and a second protrusion extends into the other of the two outer end portions toward the middle portion of the opening.

9. The pest-control device of claim 1, where at least one of the pair of latch members has a substantially planar surface, the second lock portion further comprises a web member coupled to the at least one latch member, and the web member is substantially perpendicular to the substantially planar surface of the latch member.

10. The pest-control device of claim 9, where if the second lock portion engages the first lock portion such that the upward-facing latch surfaces of the second lock portion contact the downward-facing latch surfaces of the first lock portion, the web member is substantially parallel to the longitudinal axis of the post of the first lock portion.

11. The pest-control device of claim 1, where the pair of latch members of the second lock portion each has a substantially planar surface, the second lock portion further comprises a pair of web members each coupled to a different one of the latch members, and each of the pair of web members is substantially perpendicular to the substantially planar surface of a different one of the latch members.

12. The pest-control device of claim 11, where if the second lock portion engages the first lock portion such that the upward-facing latch surfaces of the second lock portion contact the downward-facing latch surfaces of the first lock portion, the web members are substantially parallel to the longitudinal axis of the post of the first lock portion.

13. The pest-control device of claim 1, where the first lock portion and second lock portion each comprises a plastic.

14. The pest-control device of claim 1, where the opening includes a length along a first axis passing through the middle portion and the two outer end portions, where the width of the middle portion and each outer end portion is measured along a second axis perpendicular to the first axis.

15. The pest-control device of claim 14, where the width of the middle portion is greater than the width of each outer end portion.

* * * * *